July 23, 1957     R. S. COE     2,800,324
AUTOMOBILE HYDRAULIC HOOD ACTUATOR
Filed Oct. 19, 1954     3 Sheets-Sheet 1
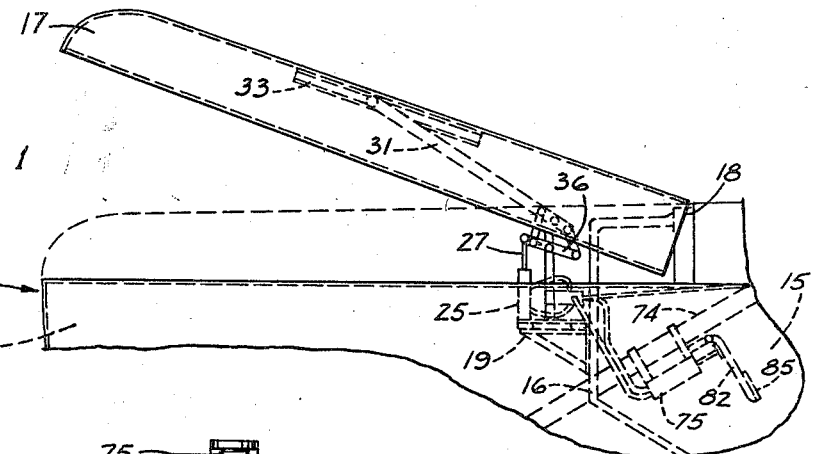
FIG. 1
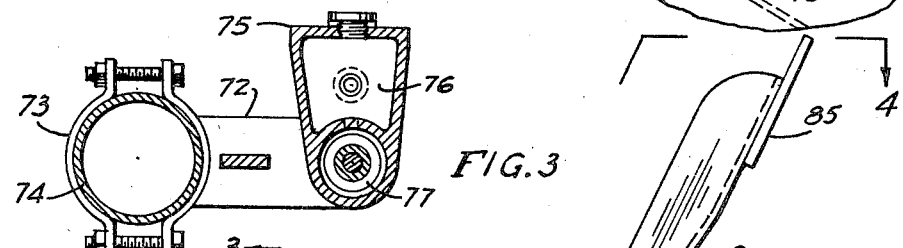
FIG. 3
FIG. 2
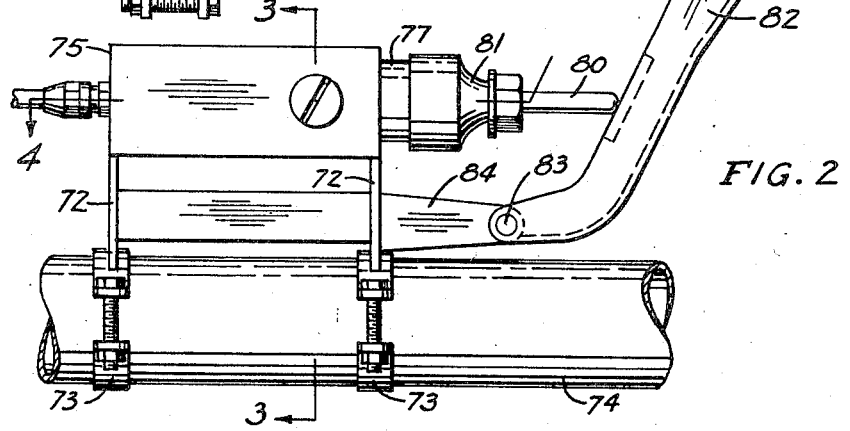
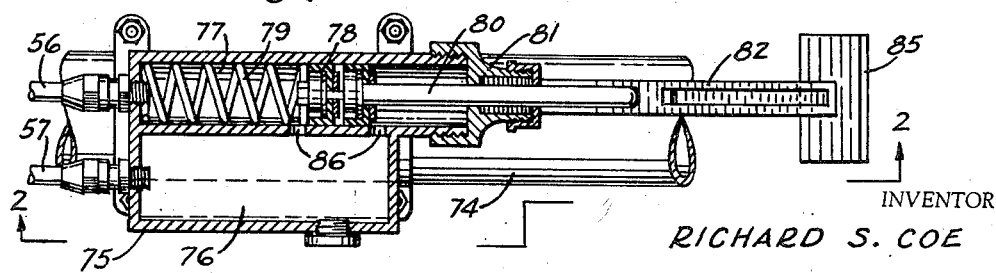
FIG. 4
INVENTOR
RICHARD S. COE
BY
McMorrow, Berman & Davidson
ATTORNEYS

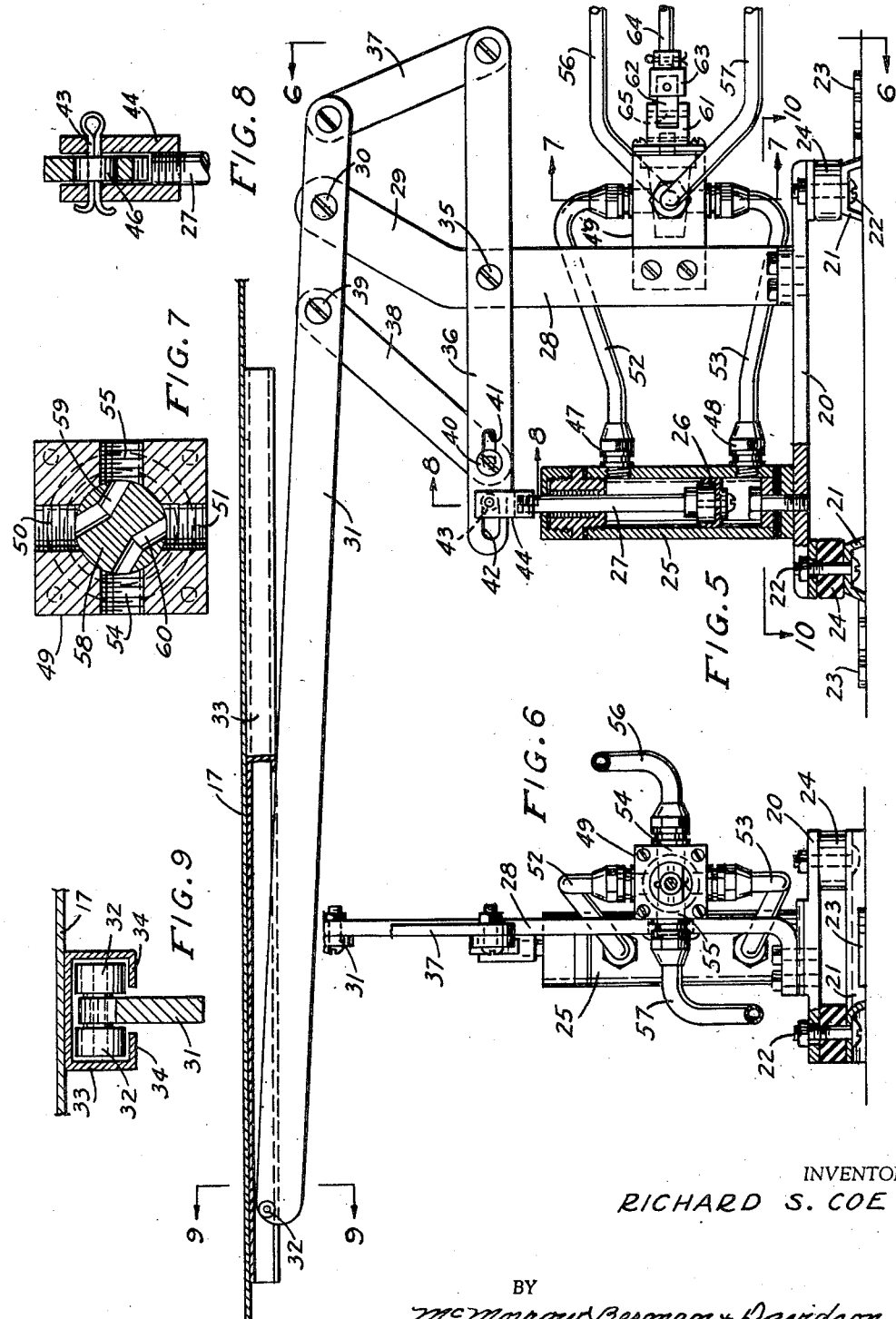

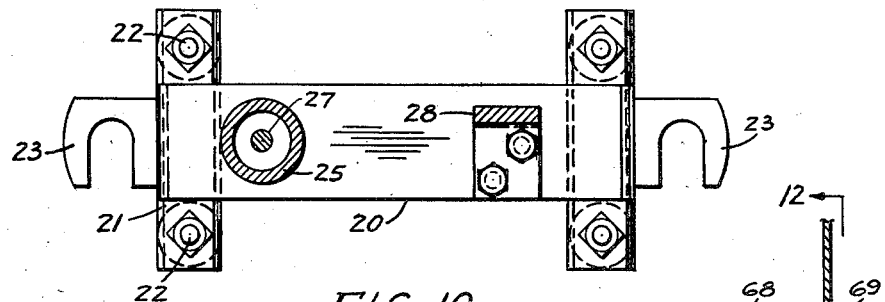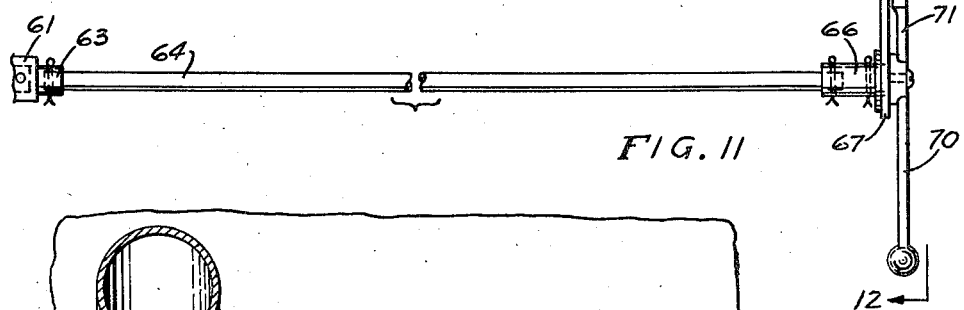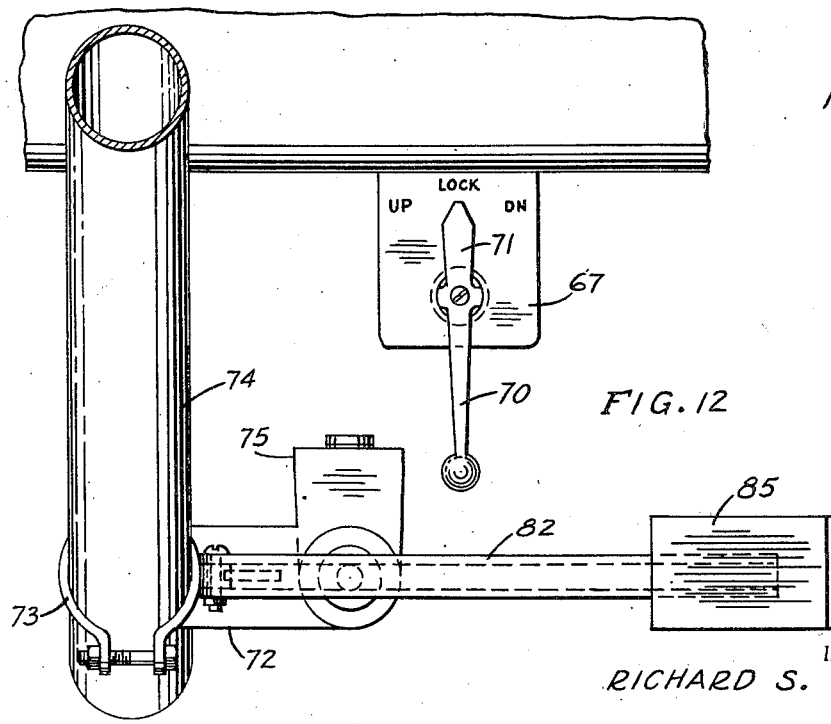

United States Patent Office 2,800,324
Patented July 23, 1957

2,800,324

AUTOMOBILE HYDRAULIC HOOD ACTUATOR

Richard S. Coe, Walled Lake, Mich.

Application October 19, 1954, Serial No. 463,183

2 Claims. (Cl. 268—75)

This invention relates to motor vehicles, and more particularly to an improved hydraulic means for lifting the hood of an automobile.

The main object of the invention is to provide a novel and improved automobile hood elevating device which is simple in construction, which may be operated from the operator's compartment of the automobile, and which provides a means for rapidly opening the hood of an automobile without requiring the operator to touch the hood itself.

A further object of the invention is to provide an improved hydraulic lifting mechanism for the hood of an automobile, said mechanism involving inexpensive components, being rugged in construction, and enabling the operator of the vehicle equipped with the mechanism to readily open and close the hood of the engine compartment of the vehicle from the driver's compartment.

Further objects and advantages of the invention will become apparent from the following description and claims, and from the accompanying drawings, wherein:

Figure 1 is a fragmentary side elevational view of the forward upper portion of a motor vehicle provided with an improved hydraulic hood lifting mechanism according to the present invention.

Figure 2 is an enlarged elevational detail view showing the operating cylinder of the hydraulic hood lifting mechanism of Figure 1 and the foot lever associated therewith, said view being taken on line 2—2 of Figure 4.

Figure 3 is a cross sectional view taken on the line 3—3 of Figure 2.

Figure 4 is a cross sectional view taken on the line 4—4 of Figure 2.

Figure 5 is an enlarged side elevational view, partly in vertical cross section of the portion of the hydraulic hood lifting mechanism mounted inside the engine compartment, as illustrated in Figure 1, and showing the fluid motor cylinder and the linkage elements associated therewith, as well as the control valve employed with the mechanism.

Figure 6 is a cross sectional view taken on the line 6—6 of Figure 5.

Figure 7 is an enlarged cross sectional detail view taken on the line 7—7 of Figure 5, said view being taken through the control valve of the mechanism and showing the control valve in a position to lower the automobile hood.

Figure 8 is an enlarged cross sectional detail view taken on the line 8—8 of Figure 5.

Figure 9 is an enlarged cross sectional detail view taken on the line 9—9 of Figure 5.

Figure 10 is a horizontal cross sectional view taken on the line 10—10 of Figure 5.

Figure 11 is a fragmentary side elevational view, partly in vertical cross section, taken through a portion of the dashboard of the vehicle of Figure 1 and showing the operating rod connecting the control valve of the hood elevating system of Figure 1 to an operating handle located adjacent the dashboard.

Figure 12 is a vertical cross sectional detail view taken on the line 12—12 of Figure 11.

Referring to the drawings, 13 generally designates a motor vehicle having an engine compartment 14 and an operator's compartment 15, said operator's compartment being located adjacent the engine compartment and being separated therefrom by the fire wall 16. Designated at 17 is a hood which is hinged to the body of the vehicle at 18 for rotation around a transverse horizontal axis, whereby the hood may be rotated from a position covering the engine compartment 14 to an elevated position, such as that shown in Figure 1.

Secured to the upper portion of the fire wall 16 subjacent the rear portion of the hood 17 is a forwardly extending supporting bracket 19 on which is mounted the horizontal support plate 20, said support plate being secured at its ends to respective mounting brackets 21, 21, by means of bolts 22, 22, as shown in Figure 5, the mounting brackets 21, 21 being provided with oppositely directed apertured lug portions 23, 23 secured in any suitable manner to the bracket member 19, suitable spacers 24, 24 being interposed between the mounting brackets 21, 21 and the respective end portions of the plate member 20, as shown in Figure 5. The spacers 24, 24 are preferably of resilient deformable material, such as rubber or the like, to provide a cushioned support for the plate member 20 and to cushion shock and vibration.

As shown in Figure 6, respective resilient deformable spacers 24 may be provided at the respective corners of the plate member 20, said plate member being, for example, rectangular in shape. Secured on the plate member 20 adjacent the forward end thereof is the vertical upstanding fluid motor cylinder 25 having the slidable piston 26 therein, said piston being connected to the vertical piston rod 27 which extends slidably and sealingly through the top end of the cylinder 25. Rigidly secured on the plate member 20 adjacent its rear end is the upstanding arm 28 having the rearwardly inclined, upwardly extending top end portion 29. Pivotally connected at 30 to the top end of the upper arm portion 29 is a lever 31 which extends forwardly a substantial distance from the pivotal connection 30 and which is provided at its forward end with the pair of laterally extending rollers 32, 32 which are engaged in the respective opposite side portions of a downwardly facing longitudinally extending channel bar 33 secured to the under side of the intermediate portion of the hood 17. The channel member 33 is provided with the inwardly extending bottom flange elements 34, 34 underlying the rollers 32, 32 and thus retaining said rollers in the channel member 33, whereby a sliding connection is defined between the forward end of the lever 31 and the hood 17. Obviously, the hood 17 may be elevated by rotating the lever 31 clockwise around its pivotal connection 30, as viewed in Figure 5.

Pivoted to the upstanding arm 28 at 35 is a link bar 36, the rear end of said link bar 36 being connected to the rear end of the lever 31 by a link bar 37, which is placed in tension when bar 36 is rotated clockwise and which therefore rotates lever 31 clockwise, as viewed in Figure 5. A link bar 38 is provided on the forward side of the inclined upper arm portion 29, said link bar 38 being connected to the lever 31 at 39 and being slidably and pivotally connected to the forward portion of the link arm 36 by a bolt 40 which engages through a slot 41 in the forward portion of the arm 36. Link bar 38 is placed in tension when bar 36 is rotated counterclockwise and therefore acts to rotate lever 31 counterclockwise against the force of the usual counterbalance spring provided with the hood 17. The forward end of the arm 36 is provided with another slot 42 through which extends a connecting pin 43 carried by a slotted head member 44 secured on the top end of the piston rod 27, the forward end portion of the arm 36 being slidably received in the slot of the head portion 44 and being slidably and pivotally connected to said head portion by the transversely extending pin 43, as shown in Figure 8.

As shown in Figure 8, a bearing roller 46 may be provided on the intermediate portion of the pin member 43, said roller being retained between the opposite side walls of the head member 44 and being slidably received in the slot 42, as well as being rotatable therein, to provide the desired pivotal and sliding connection between head member 44 and arm 36.

As shown in Figure 5, respective fluid fittings 47 and 48 are provided on the upper and lower portions of the cylinder 25. Designated at 49 is a selector valve which is rigidly secured to the lower portion of the upstanding arm 28 and which is provided with the respective top and bottom ports 50 and 51 connected to the respective fittings 47 and 48 by the respective conduits 52 and 53. The valve 49 is provided with the opposite side ports 54 and 55 to which are connected respective conduits 56 and 57, as shown in Figure 5. Rotatably mounted in the valve 49 is the selecting rotor 58 formed with the respective passages 59 and 60 which are arranged to establish communication between ports 50 and 55 and ports 54 and 51 in the position thereof shown in Figure 7, and which may be rotated 90° to establish communication between ports 50 and 54 and ports 51 and 55, if so desired, as well as being movable to an intermediate position wherein the ports 50, 51, 54 and 55 are blocked by the rotor.

The rotor 58 is rigidly connected to the external yoke member 61 which receives the end 62 of a connecting coupling 63 secured on a rod member 64, the member 62 being connected to the yoke member 61 by the hinge pin 65, as shown in Figure 5. The rod 64 extends rotatably through the fire wall 16 and is provided at its end with a head member 66 which is rotatably supported in a depending plate 67 secured to the bottom flange 68 of the vehicle dashboard 69, as shown in Figure 11, the head member 66 having a handle member 70 rigidly secured thereto adjacent the face of the plate member 67 and being provided with the pointer element 71 which extends adjacent suitable indicia provided on the face of the plate member 67 to indicate the position of the rotor 58 of valve 49, as shown in Figure 12. Figure 12 illustrates the handle 70 in the "locked" position.

Designated at 72 is a bracket member which is provided with clamping rings 73 engaged around the steering post 74 of the vehicle, whereby the bracket 72 is secured at an adjusted position on said steering post. Rigidly mounted on the bracket 72 is a housing 75 comprising a fluid reservoir 76 and an operating cylinder 77 containing the plunger 78, as shown in Figure 4. The plunger 78 is biased outwardly from the cylinder 77 by a coiled spring 79, the plunger rod 80 extending sealingly and slidably through the end member 81 of the cylinder and being biased into engagement with a lever 82 pivoted at 83 to a lug 84 provided on the bracket member 72. The lever member 82 is provided at its end with the foot pedal portion 85 which projects laterally from the steering post 74 and which may be readily engaged by the foot of the driver of the vehicle.

The reservoir 76 contains suitable hydraulic fluid, and the conduit 57 is connected to said reservoir, as shown in Figure 4, whereby hydraulic fluid may be returned to the reservoir through said conduit. The conduit 56 is connected to the end of the cylinder 77, whereby hydraulic fluid may be forced through the conduit 56 responsive to the inward movement of the plunger 78 against the force of spring 79, which may be accomplished by depressing the lever 82.

From Figure 4 it will be noted that the wall of the cylinder 77 is provided with apertures 86 in its rear portion communicating with the reservoir 76, which apertures are sealed when the plunger 78 is advanced a short distance from its normal position to apply force to the fluid in the portion of the cylinder adjacent the connection of the conduit 56 thereto. This force is developed by applying downward force on the lever 82. When the lever is released, the plunger 78 is allowed to return to its normal position by the expansion of the spring 79, and will return to a position such as that shown in Figure 4, wherein the plunger 78 is located between the two apertures 86, whereby the fluid pressure is equalized in the cylinder 77 on opposite sides of the plunger 78.

With the valve 49 in the position shown in Figure 7, the conduit 56 will be placed in communication with the conduit 53 through the port 54, the passage 60 and the port 51, whereby hydraulic fluid may be forced into the bottom portion of the cylinder 25 responsive to the depression of the lever 82. At the same time, the upper portion of the cylinder is in communication with the reservoir 76 through the conduit 52, the port 50, the passage 59, the port 55, and the conduit 57, whereby hydraulic fluid in the upper portion of the cylinder 25 may discharge into the reservoir 76, allowing the piston 26 to be elevated and allowing said piston to rotate the lever 36 clockwise, as viewed in Figure 5, to cause the hood 17 to be elevated.

However, in order to accomplish this, the handle 70 must first be rotated counterclockwise from its position of Figure 12 from the "locked" position approximately 45° to the "up" position, whereby the valve rotor 58 is moved to the position shown in Figure 7. When the hood 17 has been elevated, said hood may be locked in elevated position by returning the handle 70 to the "locked" position, whereby the valve 49 closes off the conduits 52 and 53 and the piston 26 is thus locked in its raised position. To lower the hood, the handle 70 must be rotated clockwise approximately 45°, as viewed in Figure 12, to the "on" position which rotates the valve rotor 58 90° from the position thereof shown in Figure 7 to a position wherein the conduit 56 is placed in communication with conduit 52, and hence to the upper portion of the cylinder 25, and the conduit 57 is placed in communication with the conduit 53, and hence with the lower portion of cylinder 25. Thus, when the lever 82 is thereafter depressed, the piston 26 is forced downwardly and the linkage connected to the piston rod 27 causes the hood 17 to be lowered to its closed position. By rotating the handle 70 to the "locked" position, shown in Figure 12, the hood may then be locked in closed position.

While a specific embodiment of an improved hydraulic hood elevating device for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle having an engine compartment and an operator's compartment located adjacent said engine compartment, a hood hinged to the body of the vehicle over said engine compartment, a longitudinal guide member secured to the underside of said hood, a horizontal bracket member secured to the body of said vehicle subjacent the rear portion of said hood, an upstanding arm rigidly secured to said bracket member, a lever pivoted at its intermediate portion to the top portion of said arm, means on the forward end of said lever slidably engaged with said longitudinal guide member, an upstanding fluid motor cylinder mounted on said bracket member and spaced forwardly from said arm, a piston in said cylinder, link means interconnecting said piston, arm and portions of said lever spaced on opposite sides of said arm, said link means comprising a first link bar pivoted at its intermediate portion to said arm and at one end portion to said piston, a second link bar connecting the end of the first link bar to the end of the lever, and a third link bar connecting the first link bar to the lever on the side of the arm opposite the second link bar, the second link bar being placed in tension when the piston moves upwardly and the third link bar being placed in tension when the piston moves downwardly, said link means being formed and arranged to rotate said lever upwardly or downwardly responsive to corresponding movement of said piston in said fluid motor cylinder, and an operating cylinder in said operator's compartment connected to said fluid motor cylinder and arranged to transmit fluid pressure to said fluid motor cylinder to actuate said link means.

2. In a motor vehicle having an engine compartment and an operator's compartment located adjacent said engine compartment, a hood hinged to the body of the vehicle over said engine compartment, a longitudinal guide member secured to the underside of said hood, a horizontal bracket member secured to the body of said vehicle subjacent the rear portion of said hood, an upstanding arm rigidly secured to said bracket member, a lever pivoted at its intermediate portion to the top portion of said arm, means on the forward end of said lever slidably engaged with said longitudinal guide member, an upstanding fluid motor cylinder mounted on said bracket member and spaced forwardly from said arm, a piston in said cylinder, link means interconnecting said piston, arm and portions of said lever spaced on opposite sides of said arm, said link means comprising a first link bar pivoted at its intermediate portion to said arm and at one end portion to said piston, a second link bar connecting the end of the first link bar to the end of the lever, and a third link bar connecting the first link bar to the lever on the side of the arm opposite the second link bar, the second link bar being placed in tension when the piston moves upwardly and the third link bar being placed in tension when the piston moves downwardly, said link means being formed and arranged to rotate said lever upwardly or downwardly responsive to corresponding movement of said piston in said fluid motor cylinder, an operating cylinder in said operator's compartment, and conduit means connecting said operating cylinder to the opposite ends of said fluid motor cylinder, said conduit means including a selector valve operable to connect said operating cylinder to either end of said fluid motor cylinder for transmitting fluid pressure to actuate said link means.

References Cited in the file of this patent
UNITED STATES PATENTS

| | | |
|---|---|---|
| 2,439,863 | Rappl | Apr. 20, 1948 |
| 2,535,600 | Rappl | Dec. 26, 1950 |
| 2,538,980 | Payne | Jan. 23, 1951 |
| 2,574,585 | Nielsen | Nov. 13, 1951 |
| 2,673,050 | Patch et al. | Mar. 23, 1954 |
| 2,737,254 | Bayley | Mar. 6, 1956 |